US009705761B2

(12) United States Patent
Liu (10) Patent No.: US 9,705,761 B2
(45) Date of Patent: Jul. 11, 2017

(54) OPINION INFORMATION DISPLAY SYSTEM AND METHOD

(71) Applicant: BEIJING QIHOO TECHNOLOGY COMPANY LIMITED, Beijing (CN)

(72) Inventor: Fuqiang Liu, Beijing (CN)

(73) Assignee: Beijing Qihoo Technology Co. Ltd., Beijing (CN)

( * ) Notice: Subject to any disclaimer, the term of this patent is extended or adjusted under 35 U.S.C. 154(b) by 261 days.

(21) Appl. No.: 14/411,092

(22) PCT Filed: May 15, 2013

(86) PCT No.: PCT/CN2013/075644
§ 371 (c)(1),
(2) Date: Dec. 23, 2014

(87) PCT Pub. No.: WO2014/000518
PCT Pub. Date: Jan. 3, 2014

(65) Prior Publication Data
US 2015/0207704 A1 Jul. 23, 2015

(30) Foreign Application Priority Data
Jun. 26, 2012 (CN) .......................... 2012 1 0216349

(51) Int. Cl.
*G06F 15/173* (2006.01)
*H04L 12/26* (2006.01)
*G06F 17/30* (2006.01)

(52) U.S. Cl.
CPC ........ *H04L 43/045* (2013.01); *G06F 17/3087* (2013.01); *H04L 43/10* (2013.01)

(58) Field of Classification Search
CPC .................................................... H04L 43/045
See application file for complete search history.

(56) References Cited

U.S. PATENT DOCUMENTS

2006/0251339 A1    11/2006 Gokturk
2008/0010262 A1    1/2008 Frank
(Continued)

FOREIGN PATENT DOCUMENTS

CN        101593209 A      12/2009
CN        101751458 A       6/2010
(Continued)

*Primary Examiner* — Vivek Srivastava
*Assistant Examiner* — Nicholas Celani
(74) *Attorney, Agent, or Firm* — Baker & Hostetler LLP (57) ABSTRACT

The present invention discloses a system and a method for presenting network hotspot information and relates to the field of network information technologies. The system comprises: a web page capturing module configured to capture a web page containing network hotspot information on a current network; a web page analyzing module configured to analyze the web page to acquire body information of the web page; a region identification module configured to perform region identification on the body information to acquire a corresponding region which the body information belongs to and perform quantity statistics on the web pages belonging to the same region; and a presenting module configured to present a result of the quantity statistics in a manner of map coloring. The system and the method according to the present invention may objectively and intuitively reflect the network hotspot information in various regions through performing the region identification on the web page containing network hotspot information.

17 Claims, 10 Drawing Sheets

(56) References Cited

U.S. PATENT DOCUMENTS

| | | | | |
|---|---|---|---|---|
| 2008/0113674 | A1* | 5/2008 | Baig | G06Q 10/10 |
| | | | | 455/456.3 |
| 2008/0235176 | A1* | 9/2008 | Kirovski | G06F 21/64 |
| 2009/0196510 | A1* | 8/2009 | Gokturk | G06F 17/30253 |
| | | | | 382/224 |
| 2010/0042615 | A1* | 2/2010 | Rinearson | G06F 17/30867 |
| | | | | 707/708 |
| 2010/0204914 | A1* | 8/2010 | Gad | G01C 21/36 |
| | | | | 701/533 |
| 2011/0209201 | A1* | 8/2011 | Chollat | G06F 17/30241 |
| | | | | 726/4 |

FOREIGN PATENT DOCUMENTS

| | | |
|---|---|---|
| CN | 101819573 A | 9/2010 |
| CN | 102426603 A | 4/2012 |
| CN | 102779174 A | 11/2012 |

* cited by examiner

OPINION INFORMATION DISPLAY SYSTEM AND METHOD

CROSS-REFERENCE TO RELATED APPLICATIONS

This application is the National Stage of International Application No. PCT/CN2013/075644, filed May 15, 2013, which claims the benefits of Chinese Patent Application No. 201210216349.X, filed Jun. 26, 2012, the disclosures of which are incorporated herein by reference in their entireties.

TECHNICAL FIELD

The present invention relates to the field of network information technologies, and particularly to a system and a method for presenting network hotspot information.

BACKGROUND OF THE INVENTION

Network hotspot information is propagated through the Internet and may possess strong influence. The network hotspot information is propagated and intensified through BBS forums, blogs, news comments, reposts, etc. Due to features of Internet, such as virtuality, concealment, divergence, pervading and randomness, more and more netizens are willing to express their viewpoints and spread ideas through this type of channel. Network hotspot information may to some extent impose a certain influence on social development and situation proceeding. However, most of the existing technologies can just gather network hotspot information but fail to objectively and intuitively reflect the network hotspot information in different regions.

SUMMARY OF THE INVENTION

In consideration of the aforementioned problems, the present invention is proposed in order to provide a system and a method for presenting network hotspot information, which can overcome the above problems, or at least partially solve or relieve the above problems.

According to one aspect of the present invention, a system for presenting network hotspot information is proposed. The system comprises: a web page capturing module configured to capture a web page containing network hotspot information on a current network; a web page analyzing module configured to analyze the web page to acquire body information of the web page; a region identification module configured to perform region identification on the body information to acquire a region which the body information belongs to and perform quantity statistics on the web pages belonging to the same region; and a presenting module configured to present a result of the quantity statistics in a manner of map coloring.

According to another aspect of the present invention, a method for presenting network hotspot information is proposed. The method comprises steps of: capturing a web page containing network hotspot information on a current network; analyzing the web page to acquire body information of the web page; performing region identification on the body information to acquire a region which the body information belongs to and performing quantity statistics on the web pages belonging to the same region; and presenting a result of the quantity statistics in a manner of map coloring.

According to another aspect of the present invention, there is provided a computer program, which comprises computer readable codes. When the computer readable codes are operated on a server, the server will execute any one of the methods for presenting network hotspot information according to the present invention.

According to another aspect of the present invention, there is provided a computer readable medium, which stores the computer program.

The beneficial effects of the present invention are as follows:

The system and the method according to the present invention may objectively and intuitively reflect the network hotspot information in different regions through performing region identification on the web pages containing network hotspot information. It can not only effectively and timely detect a regional distribution of the known network hotspot information on the network, but also can effectively identify key regions at the initial phase of any unknown network hotspot information.

The above description is merely an overview of the technical solution of the present invention. In order to more clearly understand the technical solution of the present invention to implement in accordance with the contents of the description, and to make the foregoing and other objects, features and advantages of the invention more apparent, detailed embodiments of the invention will be provided below.

BRIEF DESCRIPTION OF THE DRAWINGS

Through perusing the following detailed descriptions of the preferred embodiments, various other benefits and advantages will become apparent for an ordinary skilled in the art. The drawings are provided for the purposes of illustrating the preferred embodiments rather than limiting the present invention. In addition, the same symbol is used to indicate the same components throughout all the drawings. In the drawings.

EMBODIMENTS

The present invention will be further described as follows in connection with the drawings and the specific embodiments.

Figure 1:
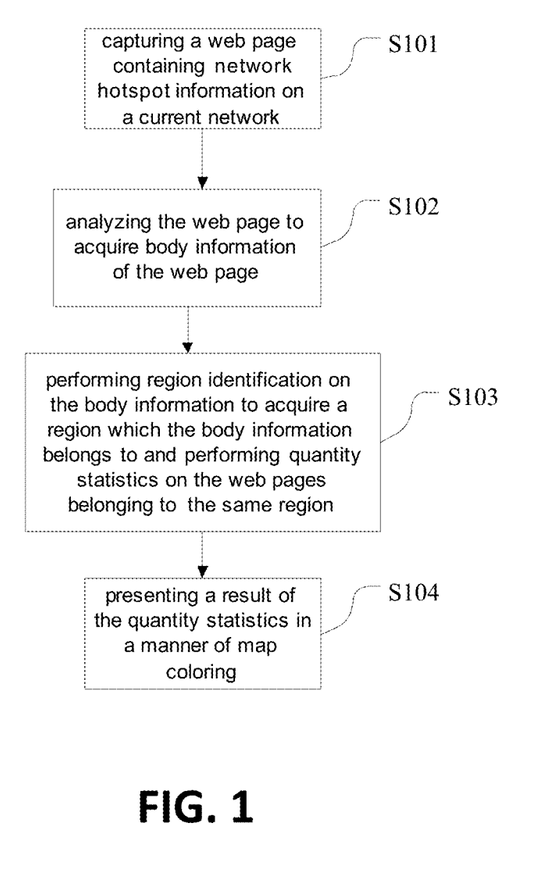
FIG. 1 schematically shows a flow chart of the method for presenting network hotspot information according to a first embodiment of the present invention.

FIG. 1 is a flow chart of the method for presenting network hotspot information according to a first embodiment of the present information. With reference to FIG. 1, the mentioned method comprises steps of:

S101: capturing a web page containing network hotspot information on a current network (generally, capturing the web page includes at least one or more of: 1. collecting new web pages; 2. collecting the web pages changed since last collection; 3. finding the web pages disappeared since last collection and deleting them from database). Preferably, in this embodiment a web crawler may be used to capture a web page containing network hotspot information on the current network.

S102: analyzing the web page to acquire body information of the web page. The body content can maximally reflect region information in the web page, thus preferably, the body information comprises body content. Similarly, the title can reflect region information, thus, in order to improve identification accuracy, preferably, the body information also comprises title. If the web page is a kind of BBS or BLOG, similarly, the board name can reflect region information. Thus, in order to improve identification accuracy, preferably, the body information comprises: board name.

In this embodiment, during analyzing the web page, a multi-dimensional extraction is performed on the web page, including titles, body contents, post time, authors, website names. For the body information of BBS or Blog, the information such as board names, view counts, and reply counts can also be extracted, so as to acquire the body information of the web page to extract the web page information in multi-dimension.

S103: performing region identification on the body information to acquire a region which the body information belongs to and performing quantity statistics on the web pages belonging to the same region.

In this embodiment, the quantity statistics can be collected in two ways: simply according to the region(s) which the body information belongs to or according to the network hotspot information containing some characteristic words in the region(s). For example, a distribution of the network hotspots in various regions of China in March can be presented, or a distribution of the network hotspots about a certain topic in Jiangsu province in March can be presented, etc.

Figure 5:
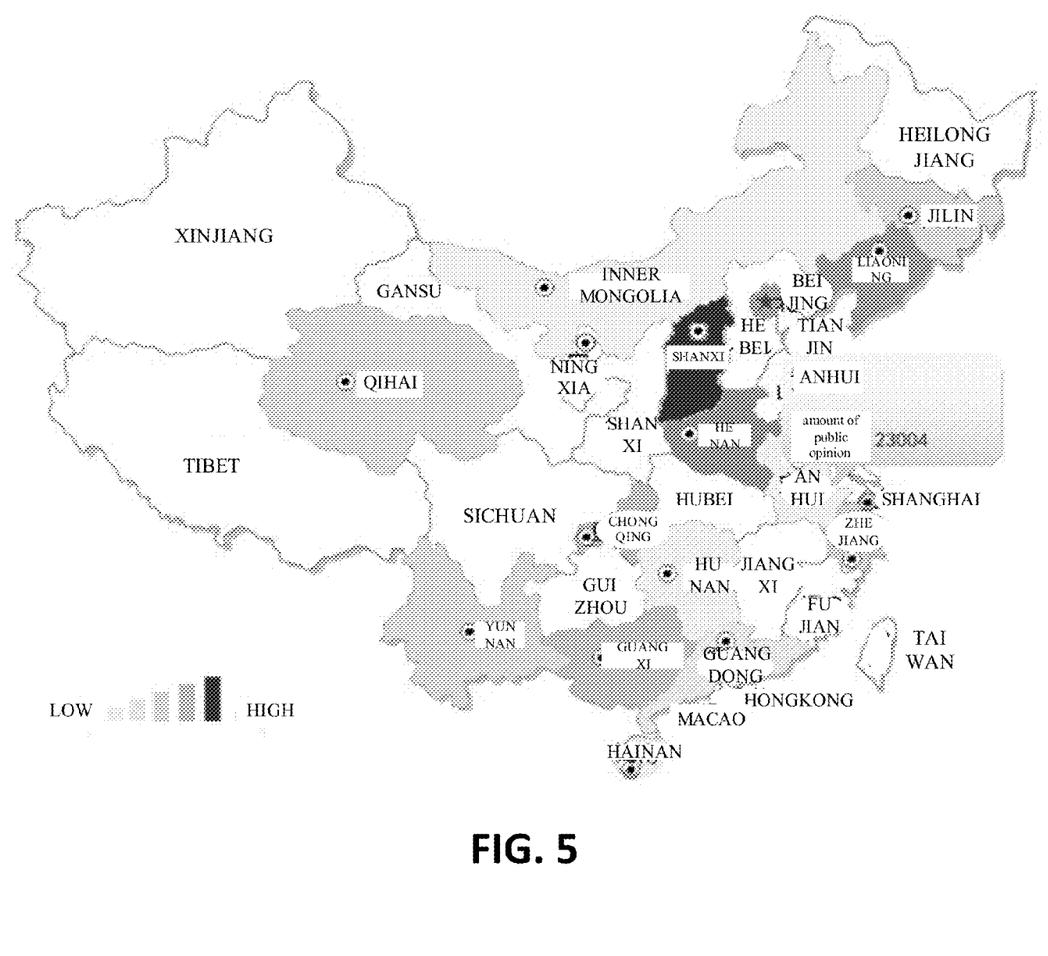
FIG. 5 is a schematic diagram of presenting by means of map coloring.

S104: with reference to FIG. 5, presenting a result of the quantity statistics in a manner of map coloring.

In this embodiment, the result of the data statistics may be utilized in combination with a range of preset color value to color the map, wherein, the color depth is used to represent an amount of the network hotspot information, and is not intended to limit the protection scope of the present invention. For example, in FIG. 5, the color level of "Shanxi province" is the darkest, so the amount of network hotspots therein is the highest. The amount of network hotspots in Beijing, Liaoning and Henan is relatively higher. Followed by the amount of network hotspots in Guangxi, Chongqing, Jilin and Zhejiang, which is also high. Then the amount of network hotspots in Qinghai and Yunnan is ordinary, the amount of network hotspots in Hainan, Guangdong, Hunan, Anhui and Inner Mongolia is under the average, wherein the amount of network hotspots in "Anhui" is 23004, and that in the rest of regions is very low.

A range of color from darkness to lightness can be indicated by #000000 to #ffffff. Six bits of hexadecimal numbers indicate three colors as R, G, B, wherein the first two bits indicate R (red), the middle two bits indicate G (green) and the last two bits indicate B (blue). For example, if a main tone for map coloring is defined as red, the range of which includes 256 levels from 00 to ff, then a hash function can be defined by the data quantity of region information to hash the data quantity over between 0 and 256 (a logarithmic function or fitting method can be used to calculate a hash function).

Preferably, at Step S104, when the result of the quantity statistics are presented in a manner of map coloring, different administrative levels of regions in the map may be adjusted for display as required. For example, the distribution of network hotspots across various regions (that is, the administrative level is province) in China in March can be presented, or the distribution of network hotspots of Jiangsu province (that is, the administrative level is city) in March can be presented.

Figure 2:
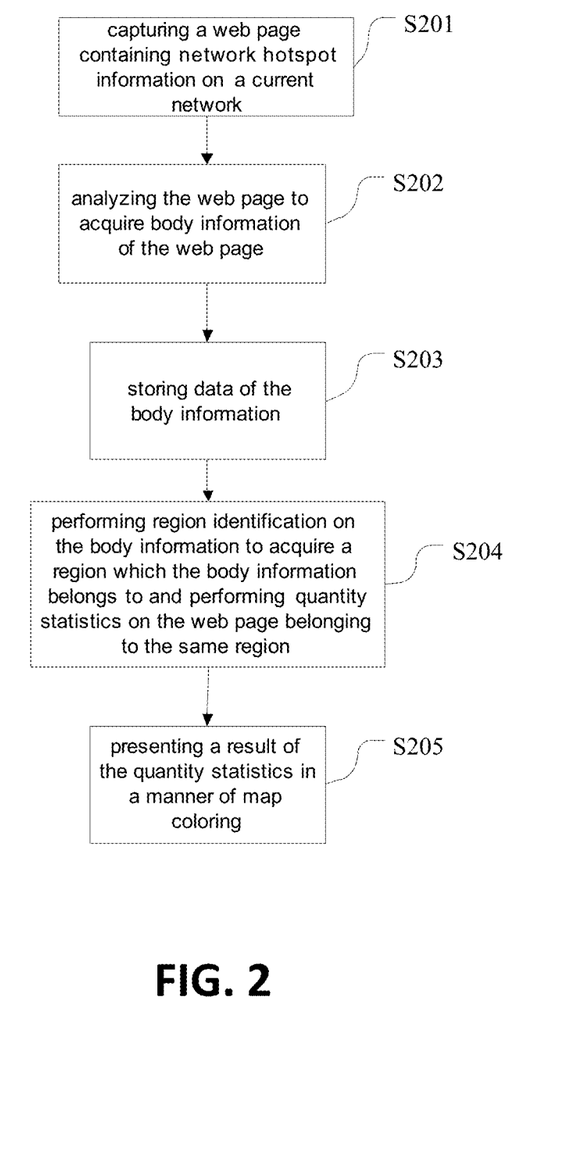
FIG. 2 schematically shows a flow chart of the method for presenting network hotspot information according to a second embodiment of the present invention.

FIG. 2 is a flow chart of the method for presenting network hotspot information according to a second embodiment of the present information. With reference to FIG. 2, the method comprises steps of:

S201: capturing a web page containing network hotspot information on a current network;

S202: analyzing the web page to acquire body information of the web page;

S203: storing data of the body information; in this embodiment, the data is permanently stored in database for future use.

S204: performing region identification on the body information to acquire a region which the body information belongs to and performing quantity statistics on the web page belonging to the same region; and S205: presenting a result of the quantity statistics in a manner of map coloring.

Figure 3:
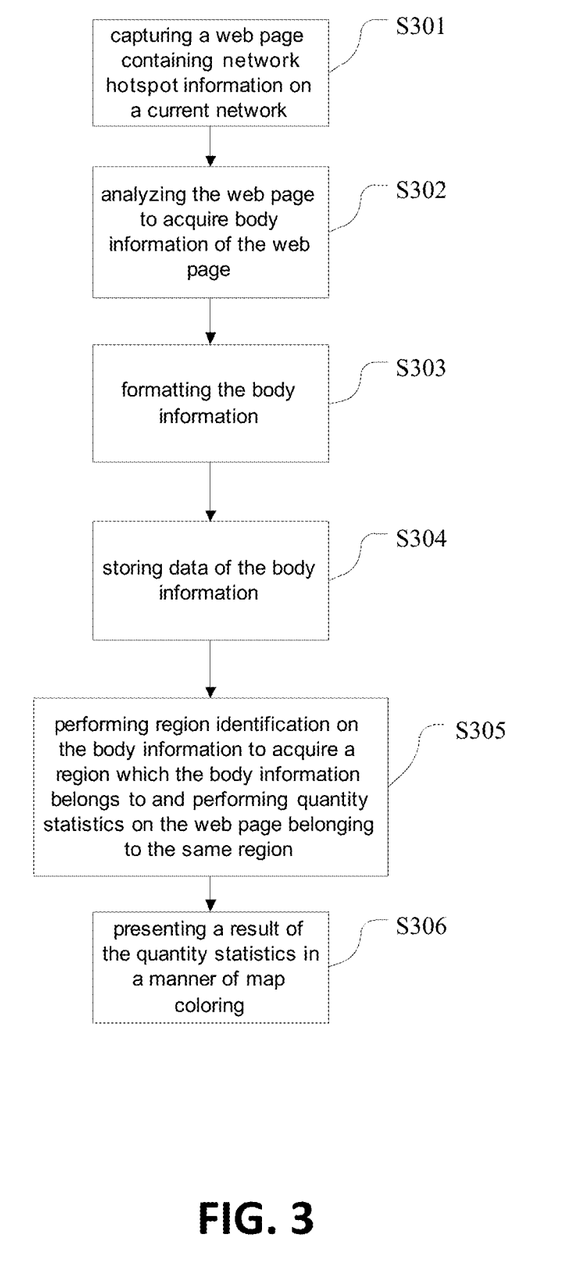
FIG. 3 schematically shows a flow chart of the method for presenting network hotspot information according to a third embodiment of the present invention.

FIG. 3 is a flow chart of the method for presenting network hotspot information according to a third embodiment of the present information. With reference to FIG. 3, the method comprises steps of:

S301: capturing a web page containing network hotspot information on a current network;

S302: analyzing the web page to acquire body information of the web page;

S303: formatting the body information (that is, processing the body information to have same style and form);

S304: storing data of the body information; in this embodiment, the data is permanently stored in database;

S305: performing region identification on the body information to acquire a region which the body information belongs to and performing quantity statistics on the web page belonging to the same region; and S306: presenting a result of the quantity statistics in a manner of map coloring.

In the first to third embodiments as described, the body information is processed for region information identification. The overall calculation model may use the distributed system infrastructure (hadoop) and the specific calculation method may use a Double Array Trie tree. The main concept thereof can be described as follows: utilizing a statistical table of administrative regions to build a Double Array Trie tree, then matching it with the body contents to search for all geographical names in the text; if there are a plurality of paths, then utilizing the administrative relation between the geographical names and utilizing their occurrence frequency to set respective weighted values; based on a principle of inverted index, performing operations such as word segmentation and index construction on the body information to provide an interface for a query in terms of keyword.

Figure 4:
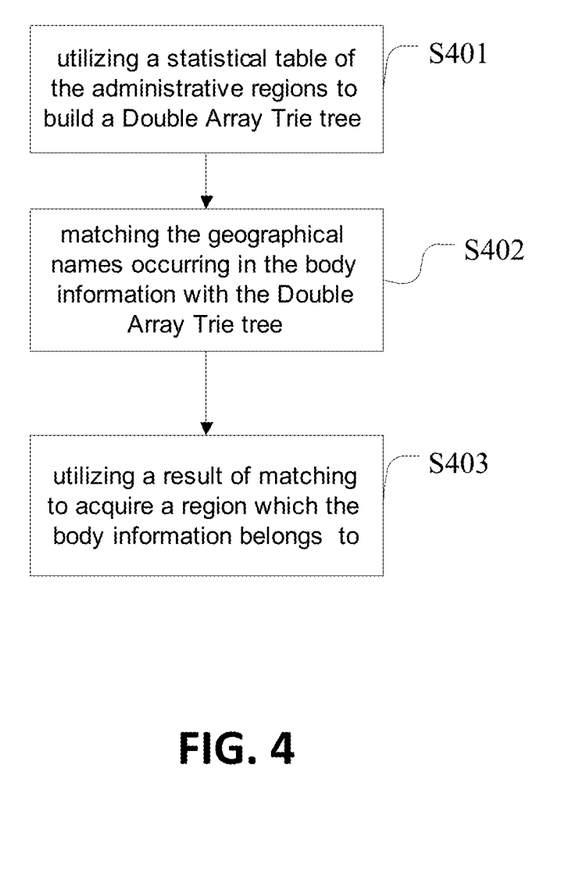
FIG. 4 schematically shows a flow chart of performing region identification on the body information in the mentioned methods of FIGS. 1-3.
Figure 6:
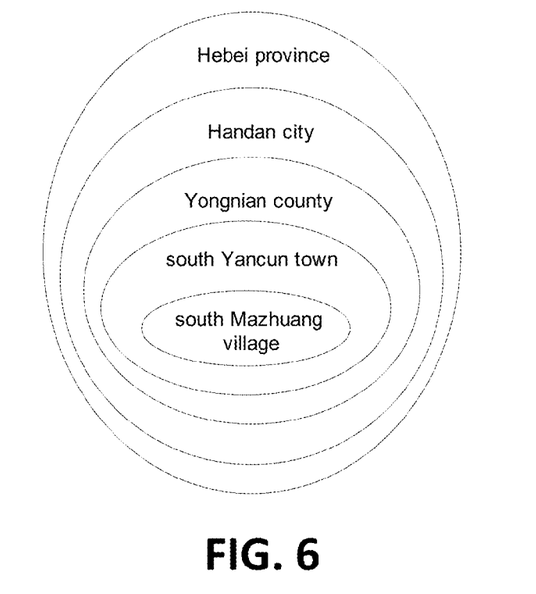
FIG. 6 is a schematic diagram of administrative levels.

The region identification on the body information is based on a method of machine learning of support vector machine (SVM). The national postal codes and the statistical table of the administrative regions are utilized to manually mark and calibrate a large amount of samples; the region identification will not be performed on the network hotspot information until a relatively high accuracy (usually above 95%) is reached. With reference to FIG. 4, the step of performing the region identification on the body information may be realized by:

S401: utilizing a statistical table of the administrative regions to build a Double Array Trie tree. The statistical table of the administrative regions comprising: a geographical name of at least one of administrative levels in province, city, county, town and village. In order to realize monitoring a amount of the network hotspot information from various administrative levels, preferably, the statistical table of the administrative regions comprising: the geographical names of five administrative levels as province, city, county, town and village which can be merged in terms of left prefix. For example: South Mazhuang village, South Yancun town, Yongnian county, Handan city, Hebei province consists of all five administrative levels and each of them can be merged to an ascending administrative level. With reference to FIG. 6, the network hotspot information in south Yancun town may belong to a region of Yongnian county, further to a region of Handan city, and finally to a region of Hebei province.

S402: matching the geographical names occurring in the body information with the Double Array Trie tree; and S403: utilizing a result of matching to acquire a region which the body information belongs to.

Preferably, the result of the matching may comprise: geographical names, occurrence frequency of the geographical names and administrative relation between the geographical names.

Figure 7:
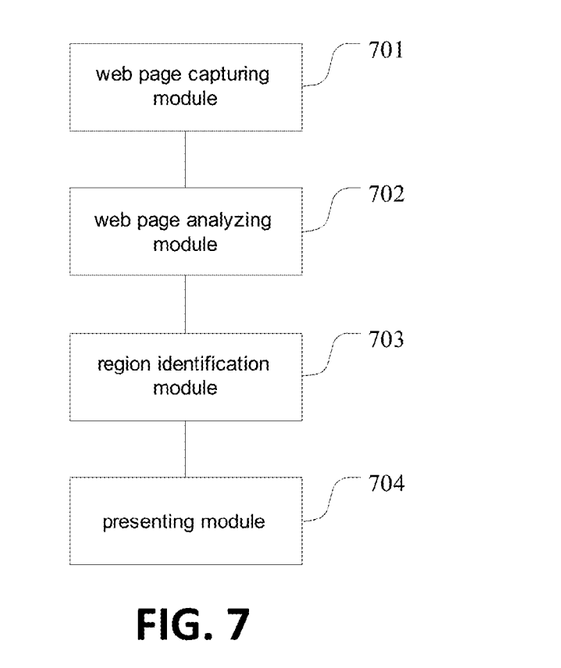
FIG. 7 is a block diagram of the system for presenting network hotspot information according to a first embodiment of the present information.

FIG. 7 is a block diagram of a system for presenting network hotspot information according to a first embodiment of the present information. With reference to FIG. 7, the system comprises:

a web page capturing module 701 configured to capture a web page containing network hotspot information on a current network;

a web page analyzing module 702 configured to analyze the web page to acquire body information of the web page;

a region identification module 703 configured to perform region identification on the body information to acquire a region which the body information belongs to and perform quantity statistics on the web pages belonging to the same region; and a presenting module 704 configured to present a result of the quantity statistics in a manner of map coloring.

Figure 8:
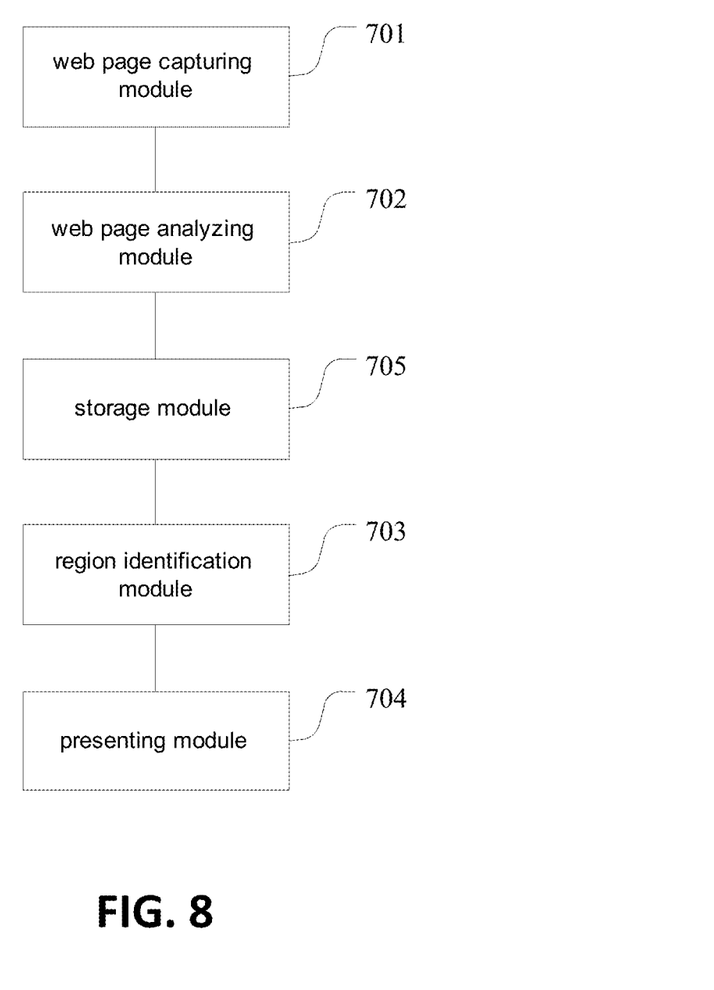
FIG. 8 is a block diagram of the system for presenting network hotspot information according to a second embodiment of the present information.

FIG. 8 is a block diagram of the system for presenting network hotspot information according to a second embodiment of the present information. With reference to FIG. 8, based on the first embodiment, the system further comprises:

a storage module 705 configured to store data of the mentioned body information.

Figure 9:
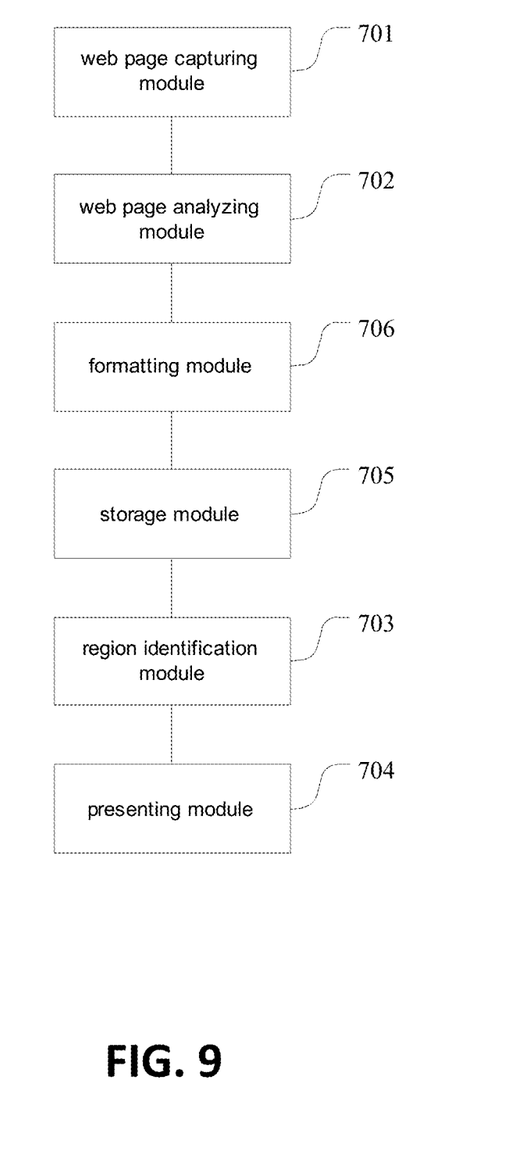
FIG. 9 is a block diagram of the system for presenting network hotspot information according to the third embodiment of the present information.

FIG. 9 is a block diagram of the system for presenting network hotspot information according to a third embodiment of the present information. With reference to FIG. 9, based on the second embodiment, the system further comprises:

a formatting module 706 configured to format the body information.

Figure 10:
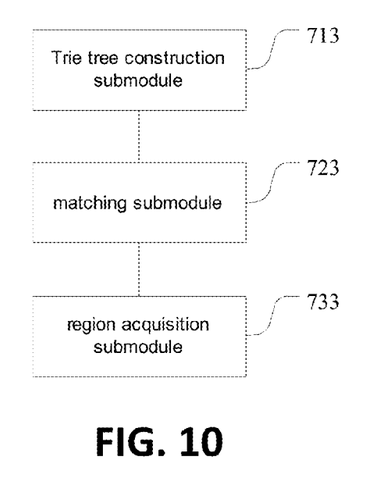
FIG. 10 is a block diagram of a region identification module in the system as shown in FIGS. 7-9.

With reference to FIG. 10, the region identification module 703 particularly comprises:

a Trie tree construction submodule 713 configured to construct a Double Array Trie tree with a statistical table of administrative regions;

a matching submodule 723 configured to match geographical names occurring in the body information with the Double Array Trie tree; and a region acquisition submodule 733 configured to utilize a result of matching to acquire the region which the body information belongs to.

Herein, the statistical table of administrative regions comprises: the geographical names of at least one of administrative levels in province, city, county, town and village.

Herein, the result of matching comprises: geographical names, occurrence frequency of the geographical names and administrative relation between the geographical names.

Herein, the web page capturing module utilizes a web crawler to capture the web page containing network hotspot information on the current network.

Herein, the body information comprises: body content and/or title.

Herein, if the web page is a kind of BBS or BLOG, the body information comprises: board name.

Herein, the web page analyzing module further comprises: a multi-dimensional extraction submodule configured to perform a multi-dimensional extraction on the web page to acquire the body information of the web page.

Herein, the presenting module further comprises: a result hashing submodule configured to hash the result of the statistics data over a range of color levels to realize the map coloring.

Herein, the presenting module further comprises: a scaling submodule configured to adjust different administrative levels of regions in the map for display as required.

Herein, the system further comprises: a learning module configured to use a support vector machine (SVM) based machine to learn until a preset accuracy is reached after a large amount of samples are manually marked and corrected.

It should be noted that in various components of the system according to the present invention, the components are sorted logically in terms of the function to be realized. Nevertheless, the present invention is not limited to this and components can be sorted and reassembled as necessary. For example, some components can be assembled into single component or some components can be further decomposed into more subcomponents.

The embodiments of various components according to the present invention can be realized by hardware or software module running in one or more processors or the combination thereof. Those skilled in the art should understand that a microprocessor or a digital signal processor (DSP) can be used in practice to realize some or all the functions of some or all the components in the system for presenting network hotspot information according to the embodiments of the present invention. The present invention can also be realized as an equipment or device program used to execute some of or all the methods as described here (for example, computer program and computer program product). Such program to realize the present invention can be stored in a readable medium of a computer or can be in a form of one or more signals. Such signals can be downloaded from Internet websites, or be provided on carrier signal or be provided by any other means.

Figure 11:
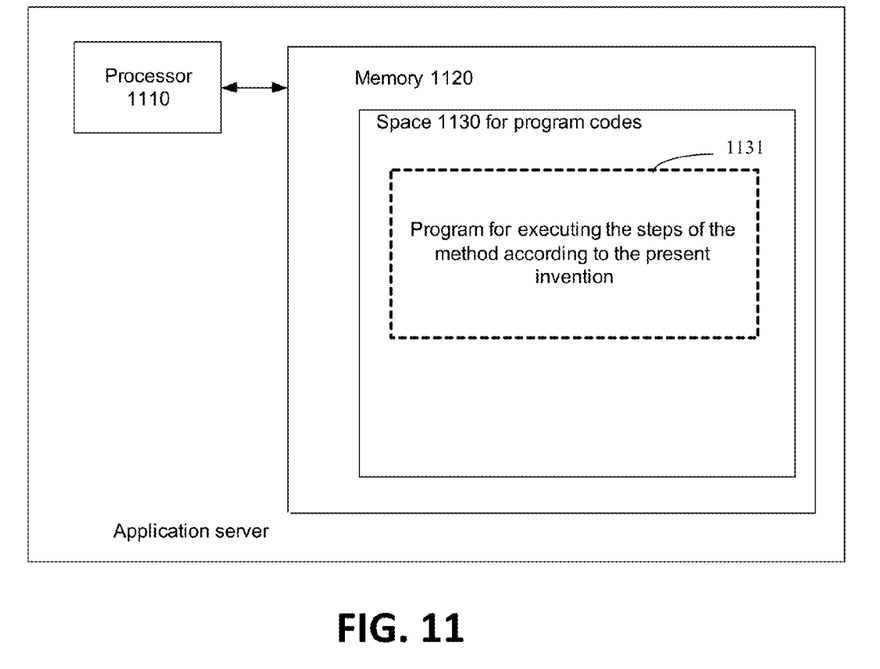
FIG. 11 schematically shows a block diagram of a server used to execute the method according to the present invention.
Figure 12:
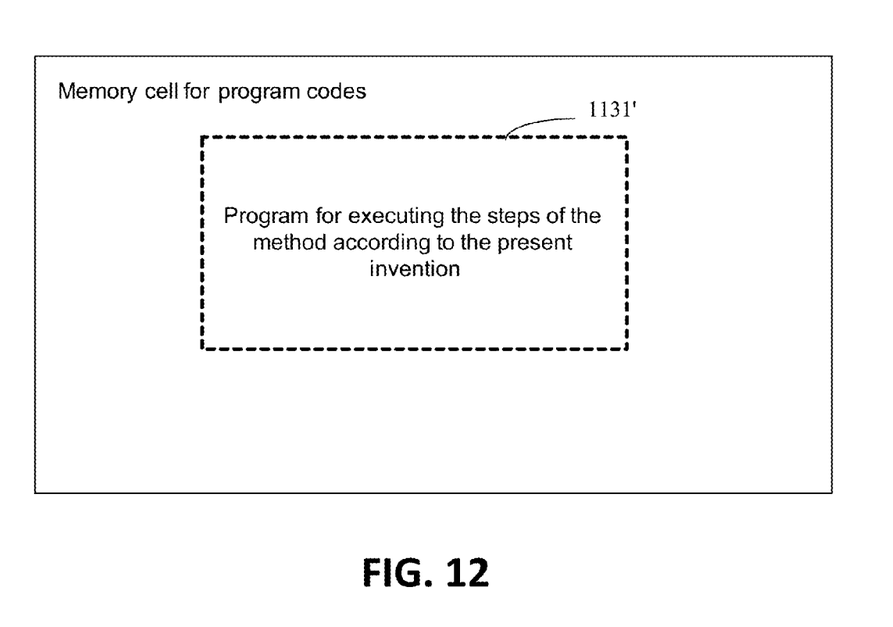
FIG. 12 schematically shows a memory cell used to store or carry program codes for realizing the method according to the present invention.

For example, FIG. 11 shows a server for realizing the method for presenting network hotspot information according to the present invention, such as an application server. Traditionally, this server comprises a processor 1110 and a computer program product or computer readable medium in form of a memory 1120. The memory 1120 can be an electronic memory such as flash memory, EEPROM (electric erasable programmable read-only memory), EPROM, hard disc or ROM. The memory 1120 has a storage space 1130 for the program codes 1131 used to execute respective steps of the methods above. For example, the storage space 1130 for the program codes can contain various program codes 1131 used to realize respective steps of the methods above. These program codes can be read from or written into one or more computer program products. These computer program products include program code carriers such as hard disc, compact disc (CD), memory card or floppy. Such computer program product is usually a portable or fixed memory cell as shown in reference FIG. 12. Such memory cell may have storage section, storage space, etc. arranged similarly as the memory 1120 in the server shown in FIG. 11. The program codes can be compressed by appropriate means. Generally, the memory cell comprises the computer readable codes 1131', that is, those codes readable by the processor such as 1110. If these codes are operated on the server, the server will execute respective steps of the methods as described above.

The "one embodiment", "embodiments" or "one or more embodiments" mentioned in the present invention means that the specific features, structures or performances described in combination with the embodiment(s) would be included in at least one embodiment. Moreover, it should be noted that, for example, the wording "in one embodiment" herein may necessarily not refer to the same embodiment.

In the specification provided herein, a number of details are described. Nevertheless, it can be understood that the embodiments according to the present invention can be put into practice without these specific details. In some examples, the methods, structures and technologies which are commonly known are not described in detail in order not to confuse understanding of the specification.

It should be noted that the embodiments as described above are intended to illustrate but not to limit the present invention. Moreover, those skilled in the art can devise other alternative embodiment without going beyond the scope of the claims as appended. In the claims, any reference symbol between the brackets shall not be interpreted as any limiting to the claims. The wording "comprise" shall not exclude any components or steps not listed in the claims. The wording "one" or "a" in front of any components shall not exclude the possibility of a plurality of such components. The present invention can be realized by hardware comprising several different components or elements, or an appropriately programmed computer. In the claims of unit listing several devices, some of these devices can be specifically realized by the same hardware. The wordings "first", "second" or "third", etc. are not intended to indicate any order. These wordings can be interpreted as names.

Also, it should be noticed that the language used in the present specification is chosen for the purpose of readability and teaching, rather than for the purpose of explaining or defining the subject matter of the present invention. Therefore, it is obvious for an ordinary skilled person in the art that modifications and variations could be made without departing from the scope and spirit of the claims as appended. For the scope of the present invention, the disclosure of present invention is illustrative but not restrictive, and the scope of the present invention is defined by the appended claims.

The invention claimed is:

1. A system for presenting network hotspot information, which comprises:
   a processor;
   a memory communicatively coupled to the processor and bearing instructions that upon execution by the processor cause the system at least to:
   capture a web page containing network hotspot information on a current network;
   analyze the web page to acquire body information of the web page;
   perform region identification on the body information to acquire a region which the body information belongs to and perform quantity statistics on the web pages belonging to the same region, wherein the memory further bears instructions that upon execution by the processor cause the system to:
   construct a Double Array Trie tree with a statistical table of administrative regions,
   match geographical names occurring in the body information with the Double Array Trie tree, and
   utilize a result of matching to acquire the region which the body information belongs to; and
   present a result of the quantity statistics in a manner of map coloring.

2. The system according to claim 1, wherein the memory further bears instructions that upon execution by the processor cause the system to:
   store data of the body information; and
   format the body information.

3. The system according to claim 1, wherein, the result of matching comprises: geographical names, occurrence frequency of the geographical names and the administrative relation between the geographical names.

4. The system according to claim 1, wherein the memory further bears instructions that upon execution by the processor cause the system to: use a web crawler to capture the web page containing network hotspot information on the current network.

5. The system according to claim 1, wherein the memory further bears instructions that upon execution by the processor cause the system to:
   perform a multi-dimensional extraction on the web page to acquire the body information of the web page.

6. The system according to claim 1, wherein the memory further bears instructions that upon execution by the processor cause the system to:
   hash a result of the statistics data over a range of color levels to realize the map coloring.

7. The system according to claim 1, wherein the memory further bears instructions that upon execution by the processor cause the system to:
   adjust different administrative levels of regions in the map for display as required.

8. The system according to claim 1, wherein the memory further bears instructions that upon execution by the processor cause the system to:
   use a support vector machine (SVM) based machine to learn until a preset accuracy is reached after a plurality of samples are manually marked and corrected.

9. A method for presenting network hotspot information, comprising:

capturing a web page containing network hotspot information on a current network;

analyzing the web page to acquire body information of the web page;

performing region identification on the body information to acquire a region which the body information belongs to and performing quantity statistics on the web pages belonging to the same region, wherein the performing region identification on the body information further comprises:

utilizing a statistical table of the administrative regions to construct a Double Array Trie tree, matching geographical names occurring in the body information with the Double Array Trie tree, and utilizing a result of matching to acquire the region which the body information belongs to; and presenting a result of the quantity statistics in a manner of map coloring.

10. The method according to claim 9, wherein, formatting the body information and storing data of the body information before performing the region identification on the body information.

11. The method according to claim 9, wherein, the result of matching comprises: geographical names, occurrence frequency of the geographical names and the administrative relation between the geographical names.

12. The method according to claim 9, wherein, a web crawler is used to capture the web page containing network hotspot information on the current network.

13. The method according to claim 9, wherein, when the web page is analyzed, a multi-dimensional extraction is performed on the web page to acquire the body information of the web page.

14. The method according to claim 9, wherein, when the result of the quantity statistics is presented in a manner of map coloring, the result of the statistics data is hashed over a range of color levels to realize the map coloring.

15. The method according to claim 9, wherein, when the result of the quantity statistics is presented in a manner of map coloring, different administrative levels of regions in the map are adjusted for display as required.

16. The method according to claim 9, wherein, before the region identification is performed on the body information and after a plurality of samples are manually marked and corrected, a support vector machine (SVM) based machine is used to learn until a preset accuracy is reached.

17. A non-transitory computer readable medium having instructions stored thereon that, when executed by at least one processor, cause the at least one processor to perform operations for presenting network hotspot information, the operations comprising:

capturing a web page containing network hotspot information on a current network;

analyzing the web page to acquire body information of the web page;

performing region identification on the body information to acquire a region which the body information belongs to and performing quantity statistics on the web pages belonging to the same region, wherein the performing region identification on the body information further comprises:

utilizing a statistical table of the administrative regions to construct a Double Array Trie tree, matching geographical names occurring in the body information with the Double Array Trie tree, and utilizing a result of matching to acquire the region which the body information belongs to; and presenting a result of the quantity statistics in a manner of map coloring.

* * * * *